Feb. 28, 1933.    R. M. PHILLIPS    1,899,586
MOTOR CONTROL SYSTEM
Filed Sept. 16, 1930
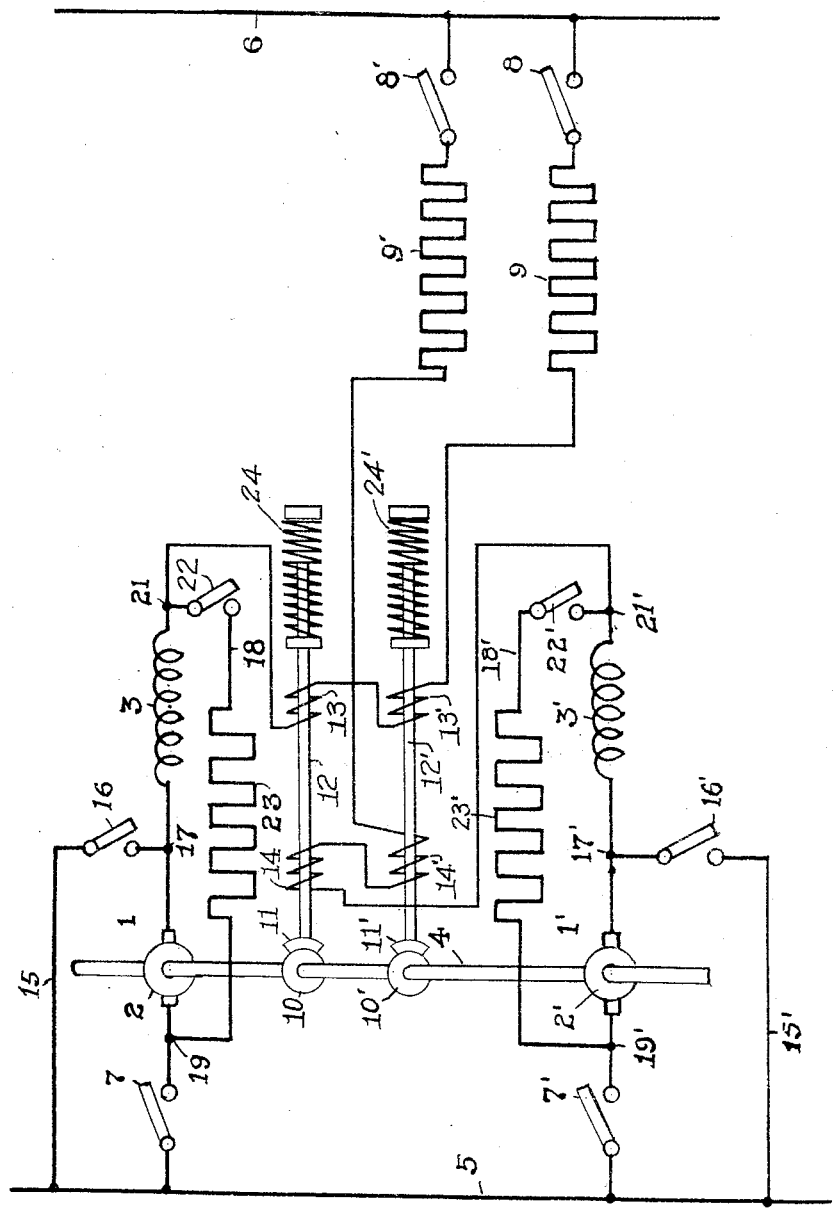
INVENTOR
R. M. Phillips
by F. N. Barber
attorney Patented Feb. 28, 1933

1,899,586

UNITED STATES PATENT OFFICE

ROBERT MONTAGUE PHILLIPS, OF CLEVELAND, OHIO, ASSIGNOR TO THE ELECTRIC CONTROLLER & MFG. COMPANY, OF CLEVELAND, OHIO, A CORPORATION OF OHIO

MOTOR CONTROL SYSTEM

Application filed September 16, 1930. Serial No. 482,220.

My invention relates to motor control systems in which two or more electric motors are each provided with an electric or magnetically operated brake and preferably mechanically connected to drive the same load by means of shafts, belts, gearing or other well known means. On trolley and bridge drives of electric cranes, the motors are connected mechanically through the track wheels and rails; on steel mill roller table drives and the like, the motors are connected mechanically through the piece which may be supported by two or more tables simultaneously. More particularly, the invention relates to the control of brakes for a plurality of motors whereby each of the brakes is released, by current through each of the motors so that all of the brakes will be released in case current fails to pass through one or more of the motors, by the current passing through the remaining motors.

When two or more motors are used to operate the same hoisting apparatus, it is customary to provide each motor with an electric brake which assists in stopping the load and holding the load when the motors are at rest. If one of the motors is disabled or if the control apparatus is out of order, it is desirable to operate the hoisting apparatus by the remaining motor or motors. This is particularly true with motors for operating hot metal cranes and hot metal mixers in the steel industry. Since all of the brakes act to stop and hold the load it is necessary to release the brake of a disabled motor so that the mechanism can be operated by another motor or motors.

One of the principal objects is to provide for the release of all of the brakes by current through each of the motors in the system. To accomplish this a plurality of windings are provided for each brake, the number of windings being equal to the number of motors in the system, and connections are made to the brake windings so that if current fails to pass through any motor the brake associated with this motor will be released or held released by the current through the remaining motor or motors. This makes it practical to disconnect any motor from the system by opening a main line switch for that motor.

The drawing shows diagrammatically one of the many motor system to which my invention may be applied.

I have shown my invention adapted to the hoisting and lowering of loads. I have not shown any circuits for controlling the speeds of hoisting and lowering as such circuits may be readily supplied by those skilled in the art to which this invention belongs. The control circuits shown in the application of D. C. Wright, Serial No. 395809, filed September 28, 1929, may be added for the control of the motor speeds.

I have shown two motors each provided with electro-magnetic brakes and each adapted to be set by a spring and released by current through a winding. It will be understood that more than two motors may be employed each having a brake winding in series with each of the motors.

I have shown the invention applied to hoisting motors, but it is clearly applicable to reversing and non-reversing and other types of motor systems.

On the drawing, 1 designates a motor having an armature 2 and the series field winding 3. 1' designates a second motor having the armature 2' and the series field winding 3'. The armatures of the two motors are mechanically connected by the shaft 4. 5 and 6 are the two current supply lines. 7 is a switch for connecting the line 5 to the armature 2 and 8 is a switch connecting the line 6 to the field 3 through the resistance 9. 10 is a brake drum for the motor and is provided with the brake shoe 11 carried by the core armature 12.

7' is a switch connecting the line 5 to the armature 2' and 8' is a switch connecting the line 6 to the resistance 9' connected in series with the field winding 3'. 10' is a brake drum for the motor 1' and is provided with the brake shoe 11' carried by the core armature 12'.

13 and 13' are operating windings for the core armatures 12 and 12' and are respectively wound thereon. These two windings are in series with the field winding 3 and the resistance 9. The windings 14 and 14' are respectively wound upon the core armatures 12 and 12' and are in series with the field 3' and the resistance 9'.

15 is a wire connecting the supply line 5 through the switch 16 to the point 17 which is between the armature 2 and the field winding 3. 15' is a wire connecting the supply line 5 through the switch 16' to the point 17' between the armature 2' and the field winding 3'.

18 is a wire connecting the point 19 between the switch 7 and the armature 2 to the point 21 through the switch 22. The wire 18 contains the resistance 23. The wire 18' connects the point 19' which is between the switch 7' and the armature 2' through the switch 22' to the point 21'. The point 21' is between the field 3' and the brake winding 14 while the point 21 is between the field winding 3 and the brake winding 13. The resistance 23' is in the wire 18'.

For hoisting the switches 7, 7' and 8, 8' are closed and the switches 16, 16' and 22, 22' are opened. Current flows from the line 5 through the switch 7, the armature 2, the field winding 3, the brake windings 13 and 13', the resistance 9, and the switch 8 to the line 6. At the same time current flows from the line 5 through the switch 7', the armature 2', the field winding 3', the windings 14 and 14', the resistance 9' and the switch 8' to the line 6. The current through these circuits causes the two motors to operate in the hoisting direction. The current through the motor 1 flows through the winding 13 of one brake and the winding 13' of another brake, and current through the motor 1' flows through the winding 14 of the first brake and the winding 14' of the second brake. These windings cause the brake shoes to be lifted from their respective brake drums against the restraining force of the springs 24 and 24'. As each brake is operable by windings receiving current from each motor, either brake may be operated in case either motor is out of order or in case the line switch of either motor is open. In case the motor 1 is out of order or the switch 7 or 8 or both are open, the motor 1' can operate since the current through this motor passes through the windings 14 and 14' for each brake.

In lowering a load the switches 7 and 7' are opened and the switches 16 and 16', 22 and 22', and 8, 8' are closed.

Current from the line 5 passes through the motor armatures in the opposite direction from what it did when the motors were connected for hoisting while current through the fields flows in the same direction as before. Current is thus supplied for lowering the load and in case the load overhauls the motor the speed of the motor will be checked by the dynamic braking circuits connected around the armature and field of each motor. The means for varying the amount of the resistance in these dynamic braking circuits have not been shown as they can be readily supplied.

It will be understood by those skilled in the art to which this invention belongs that one of the brakes may be omitted together with the windings for operating the same.

I claim:—

1. In an electric motor system, a plurality of electric motors, a magnetically operated brake for each motor, and a plurality of operating windings for each brake, a winding of each brake being in the circuit of each of the motors.

2. In a system for the simultaneous control of two electric brakes, two motors with their rotor members mechanically connected to the same load, a magnetically operated brake for each motor, and two operating windings for each brake, one winding of each brake being connected in the circuit of one motor, the remaining winding of each brake being connected in the circuit of the other motor.

3. In an electric motor system, a plurality of electric motors each having armature and field windings, a magnetically operated brake for each motor, a plurality of windings for each brake, and means for connecting the brake windings in series with the motor armatures so that the current in one motor only will cause all the brakes to operate.

4. In combination, two electric motors mechanically connected to the same load, an electric brake for each motor, two windings for operating the brakes, and means for connecting the windings to the motors so that both brakes will be operative when current passes through one or both of the motors.

5. In combination, a source of supply two electric motors mechanically connected to the same load, means for connecting both motors to the source, a switch for disconnecting one of the motors from the source, an electrically operated brake for each of the said motors, two windings for operating each brake, and means connecting the motors in series with the windings so that both of the brakes will be operated when the switch is open.

6. In combination, a source of supply, a plurality of electric motors, means for connecting the motors to the source, a switch for disconnecting at least one of the motors from the source, an electrically operated brake for a plurality of the motors, a plurality of windings for operating each brake, and means connecting the motors in series relation with the windings so that all of the brakes will be operated when the switch is open.

7. In combination, a source of supply, a plurality of electric motors, a plurality of electrically operated brakes, a plurality of windings for operating each of the brakes, means connecting the motors and the windings to the source for operating the motors and the brakes, the connecting means being arranged to cause the brakes to be operative when current flows in fewer than all the motors.

8. In combination, two motors, an electric brake for each motor, means for turning both motors including a circuit including one motor and a winding for releasing each brake, and means for turning both motors including a circuit including the other motor and another winding for releasing each brake.

9. In combination, two electric motors, an electric brake for each motor, means for releasing both brakes including a circuit through one motor and a winding for effecting the release of each brake, and means for releasing both brakes including a circuit including the other motor and a second winding for effecting the release of each brake.

10. In combination, a plurality of electric motors, a brake for stopping the motors, and a power circuit for each motor, each circuit including electro-magnetic means for releasing the brake.

11. In combination, a plurality of electric motors, a brake for stopping the motors, plural windings for the brake adapted when energized to release the brake, and a power circuit for each motor, each circuit containing one of the windings.

12. In combination, a plurality of electric motors, a brake for stopping the motors, plural windings for the brake, each adapted when energized to release the brake, and a power circuit for each motor, each circuit containing one of the windings.

In testimony whereof I affix my signature.

ROBERT MONTAGUE PHILLIPS.